(12) United States Patent
Yamada

(10) Patent No.: US 7,726,691 B2
(45) Date of Patent: Jun. 1, 2010

(54) STEERING COLUMN DEVICE

(75) Inventor: Jun Yamada, Maebashi (JP)

(73) Assignee: NSK Ltd., Tokyo (JP)

( * ) Notice: Subject to any disclaimer, the term of this patent is extended or adjusted under 35 U.S.C. 154(b) by 646 days.

(21) Appl. No.: 11/194,965

(22) Filed: Aug. 2, 2005

(65) Prior Publication Data
US 2006/0028010 A1 Feb. 9, 2006

(30) Foreign Application Priority Data

Aug. 5, 2004 (JP) ............................. 2004-229410
Jun. 28, 2005 (JP) ............................. 2005-188111

(51) Int. Cl.
B62E 1/18 (2006.01)
(52) U.S. Cl. ....................................... 280/775; 74/493
(58) Field of Classification Search ................ 280/775, 280/777; 74/493, 492; 403/290, 109.1, 110; 248/74.1, 74.2, 74.3, 230.1, 230.8
See application file for complete search history.

(56) References Cited

U.S. PATENT DOCUMENTS

| | | | | | |
|---|---|---|---|---|---|
| 612,685 | A | * | 10/1898 | Thorp et al. ................. | 403/290 |
| 2,584,636 | A | * | 2/1952 | Sprinkel et al. ............... | 74/494 |
| 5,193,930 | A | * | 3/1993 | Chi .............................. | 403/24 |
| 5,851,084 | A | * | 12/1998 | Nishikawa ................... | 403/344 |
| 5,979,265 | A | | 11/1999 | Kim et al. ..................... | 74/493 |
| 6,301,990 | B1 | * | 10/2001 | Lewis .......................... | 74/493 |
| 6,413,006 | B1 | * | 7/2002 | Neugart ....................... | 403/344 |
| 6,467,807 | B2 | | 10/2002 | Ikeda et al. .................. | 280/775 |
| 6,557,878 | B2 | * | 5/2003 | Chen ........................ | 280/226.1 |
| 6,990,874 | B2 | * | 1/2006 | Murakami et al. ............ | 74/493 |
| 7,074,135 | B2 | * | 7/2006 | Moore .......................... | 473/296 |
| 7,219,926 | B2 | * | 5/2007 | Ikeda et al. .................. | 280/775 |
| 2001/0019205 | A1 | * | 9/2001 | Ikeda et al. .................. | 280/775 |
| 2003/0000330 | A1 | | 1/2003 | Murakami et al. ............ | 74/492 |

FOREIGN PATENT DOCUMENTS

| | | | |
|---|---|---|---|
| JP | 3-128564 U | | 12/1991 |
| JP | 2966392 B2 | | 8/1999 |
| JP | 2002-53048 A | | 2/2002 |
| WO | WO 03/059718 A1 | | 7/2002 |
| WO | WO 03/059718 | * | 7/2003 |
| WO | WO 03/095286 A1 | | 11/2003 |

* cited by examiner

Primary Examiner—Eric Culbreth
(74) Attorney, Agent, or Firm—Sidley Austin LLP

(57) ABSTRACT

A structure of the steering column device for clamping the outer column to the inner column is simple and its manufacturing cost is reduced. The outer column 1 and the bushing are stopped against rotation to the clamp members and at the same time when the outer column is adjusted in its telescopic position in respect to the inner column, the outer column, clamp members and bushing can be integrally and axially slid. Since the bushing having a low frictional coefficient is present between the inner circumference of the outer column and the outer circumference of the inner column, the outer column can be moved with a light force in respect to the inner column.

11 Claims, 15 Drawing Sheets

Fig. 9
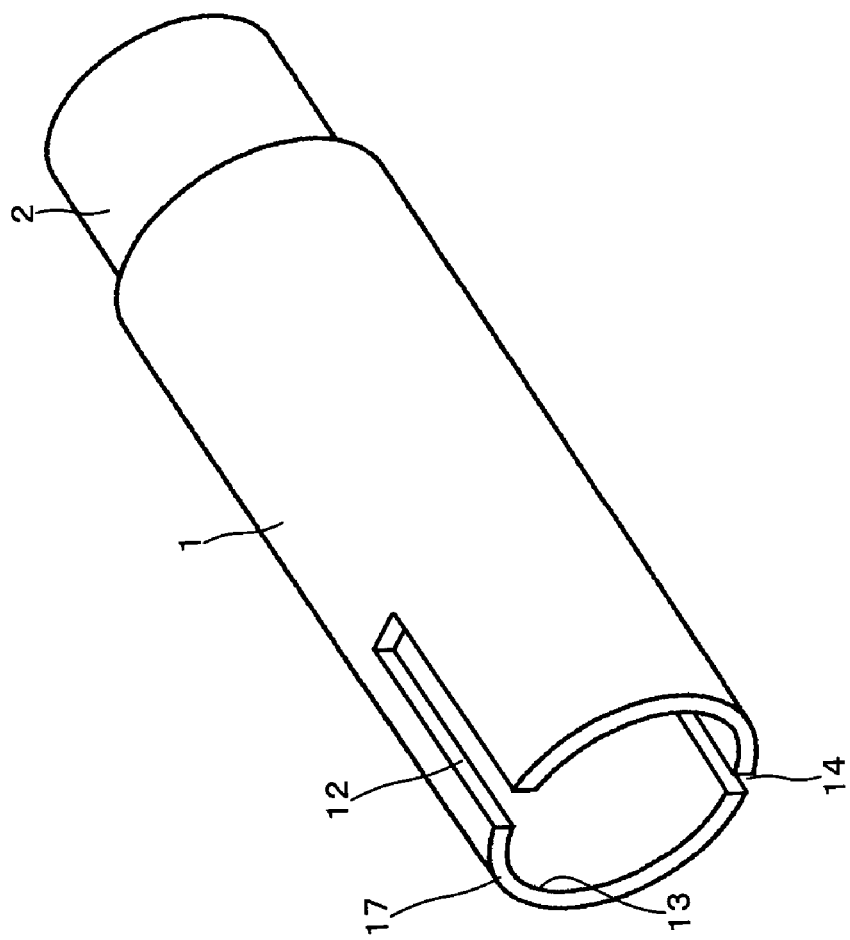
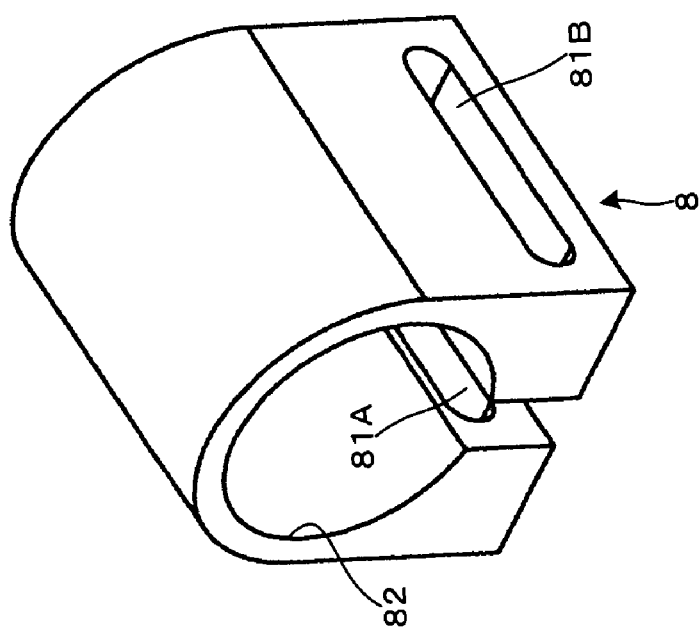

Fig. 11
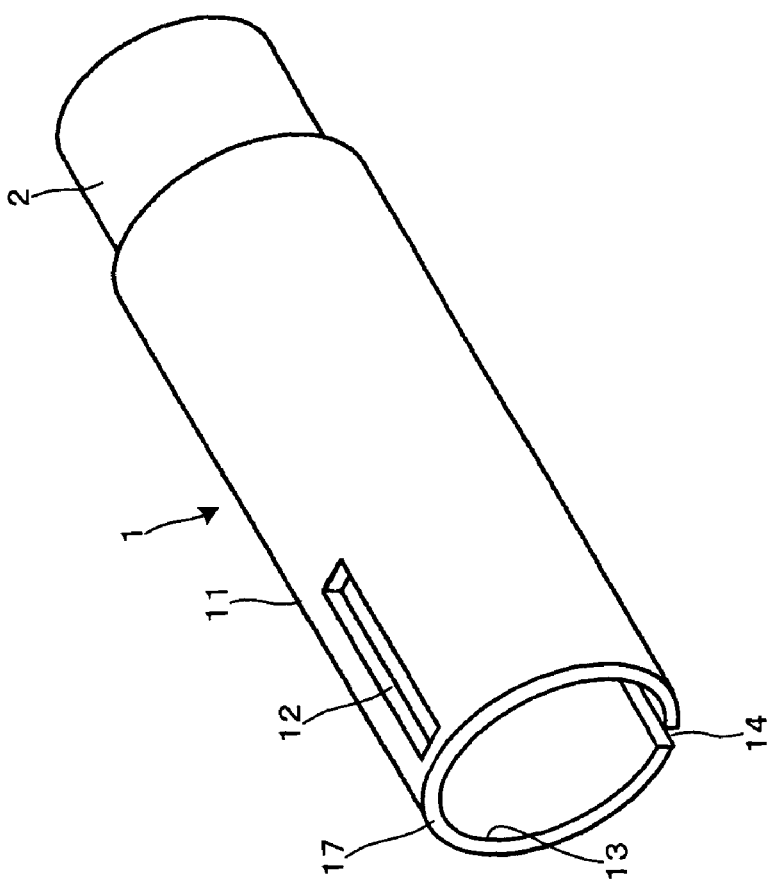
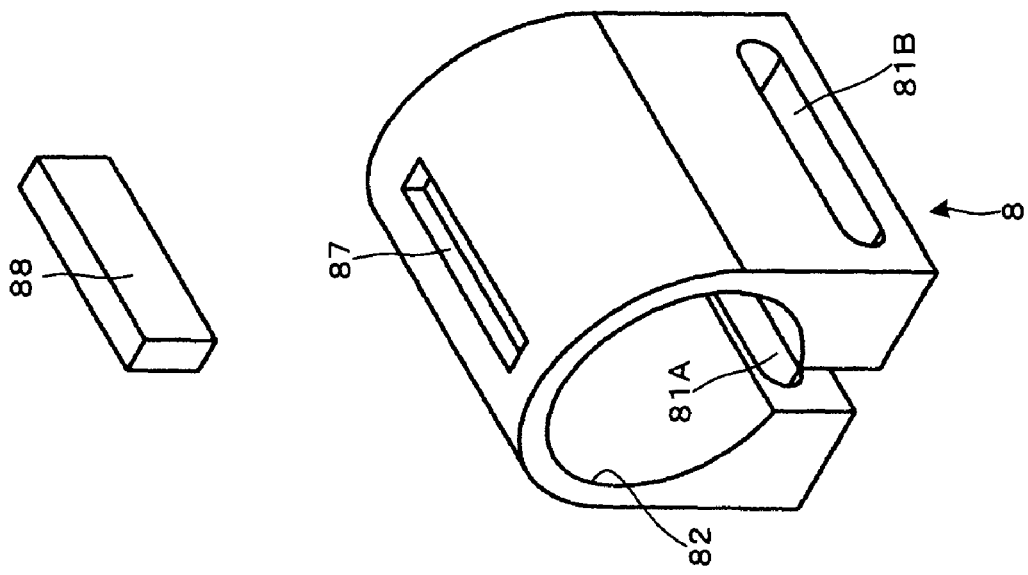

Fig. 15
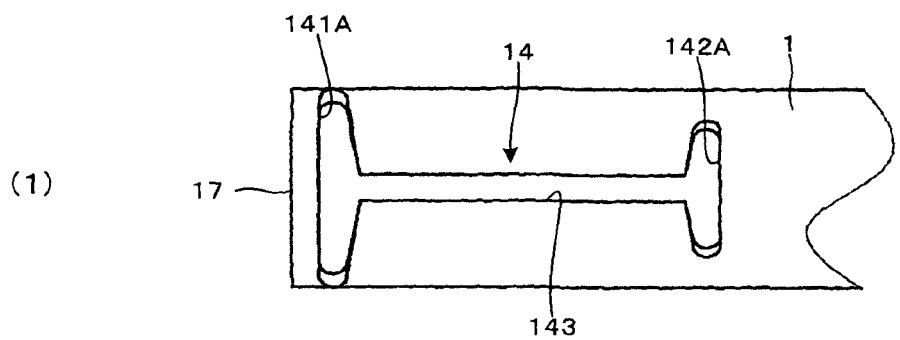
(1)
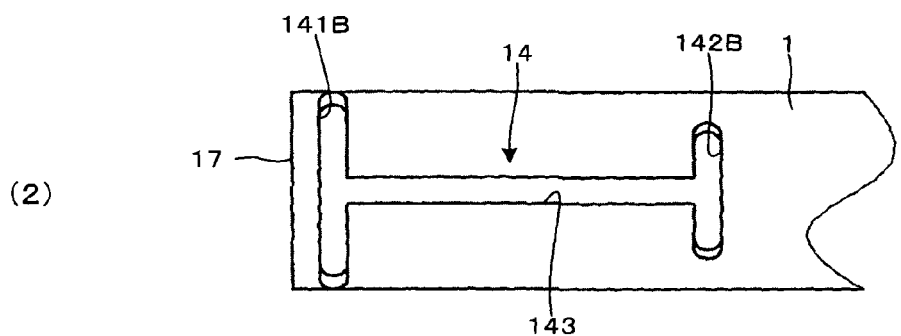
(2)
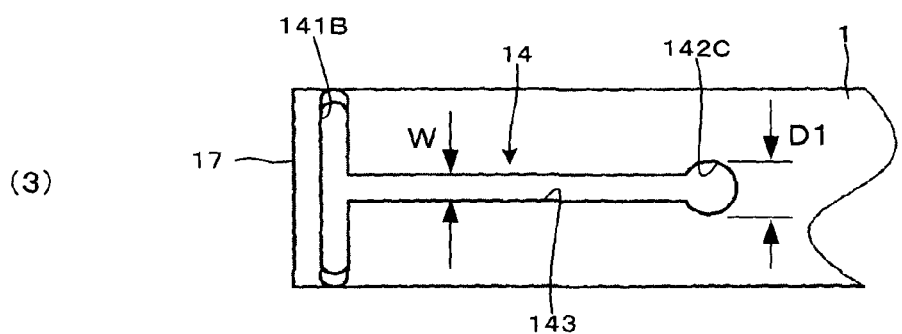
(3)
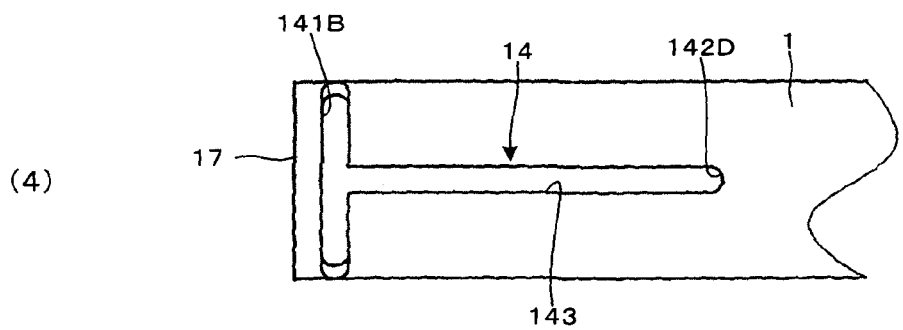
(4)

STEERING COLUMN DEVICE

This application is based on application No. 2004-229410 and No. 2005-188111 filed in Japan, the contents of which are hereby incorporated by reference.

FIELD OF THE INVENTION

The present invention relates to a steering column device and more particularly to a steering column device in which an outer column and an inner column are axially and slidably fitted to each other to cause a telescopic position of a steering wheel to be adjusted or when a secondary collision occurs, the steering wheel is collapsed and moved to absorb collision load.

BACKGROUND OF THE INVENTION

There is provided a steering column device in which the outer column and the inner column are axially and slidably fitted to each other to cause a telescopic position of the steering wheel to be adjusted or a collision load at the time of secondary collision. In such a steering column device described above, a distance bracket for use in clamping the inner column while the diameter of the outer column is reduced is integrally formed with the outer column.

For example, when the outer column is formed by a steel pipe, the distance bracket formed by a press work is welded to the outer column and integrally fixed (Patent Document 3 and Patent Document 5). In addition, there is also provided a system that both the outer column and the distance bracket are integrally formed by an aluminum die casting process (Patent Document 1, Patent Document 2, Patent Document 4, Patent Document 6, Patent Document 7).

However, the prior art constitution in which the distance bracket is welded to the outer column or integrally formed by a die-casting process had a problem that a manufacturing cost is increased due to a complex structure of the outer column.

[Patent Document 1] Gazette of Japanese Patent Laid-Open No. 2002-053048
[Patent Document 2] Gazette of Japanese Utility Model Laid-Open No. 128564/1991
[Patent Document 3] Specification of U.S. Pat. No. 5,979,265
[Patent Document 4] Specification of U.S. Pat. No. 6,467,807
[Patent Document 5] Specification of U.S. Patent Laid-Open No. 2003/0000330
[Patent Document 6] Brochure of WIPO WO03/059718
[Patent Document 7] Brochure of WIPO WO03/095286

SUMMARY OF THE INVENTION

It is an object of the present invention to provide a steering column device in which an outer column and an inner column are axially and slidably fitted to each other, wherein a structure of the distance bracket for use in fastening the outer column has a simple configuration, provides a reduced manufacturing cost and provides for a more efficient fastening of the inner column against the outer column.

The aforesaid object can be attained by applying the following means. That is, the first invention is a steering column device comprising an inner column, a hollow outer column outwardly fitted to the inner column in an axial relative slidable manner and having a slit formed over a predetermined axial length, a vehicle fixed bracket that can be fixed to a vehicle body, a clamp member arranged inside the vehicle fixed bracket and engaged with the outer column for holding an outer circumference of the outer column, and a clamp device for use in fastening the vehicle fixed bracket, reducing a diameter of the outer column and clamping the inner column against the outer column in an axial relative immovable manner.

The second invention is the steering column device according to the first invention characterized in that an engagement between the clamp member and the outer column is carried out by causing an engagement protrusion formed at the clamp member to be engaged with an engagement cavity formed at an outer circumference of the outer column.

The third invention is the steering column device according to the second invention characterized in that the inner column is formed with an engagement cavity engaged with an engagement protrusion of the clamp member and formed to have a longer axial length than that of the engagement protrusion only by a telescopic adjustment distance.

The fourth invention is a steering column device according to the second invention characterized in that the engagement protrusion is a separate part different from the clamp member.

The fifth invention is a steering column device according to the third invention characterized in that the engagement protrusion is a separate part different from the clamp member.

The sixth invention is a steering column device according to any one of the first to fifth inventions characterized in that the clamp member is comprised of a pair of parts that are symmetrical in respect to a vertical plane passing through a center axis of the outer column.

The seventh invention is a steering column device according to any one of the first to fifth inventions characterized in that the clamp member is integrally formed.

The eighth invention is a steering column device according to any one of the first to fifth inventions characterized in that the clamp member is arranged such that it can be axially moved in respect to the vehicle fixed bracket.

The ninth invention is a steering column device according to any one of the first to fifth inventions characterized in that a sliding surface between the outer column and the inner column is provided with a low frictional member for reducing a sliding resistance.

The tenth invention is a steering column device according to any one of the first to fifth inventions characterized in that each of both axial ends of the slit is formed with a closing end not released at the axial end surface of the outer column.

The eleventh invention is a steering column device according to the tenth invention characterized in that at least one of the closed ends is formed with a slit in a direction perpendicular to the slit.

In accordance with the first invention, the structures of the outer column and the clamp member become simple and their manufacturing cost can be reduced because the clamp member formed separately from the outer column is engaged with the outer column and a diameter of the outer column is reduced through this clamp member.

In accordance with the second invention, a manufacturing of the outer column becomes easy because the engagement cavity is formed at the outer column.

In accordance with the third invention, the engagement cavity of the clamp member and the engagement cavity of the inner column can be utilized as a stopper when the telescopic adjustment is carried out.

In accordance with the fourth and fifth inventions, since the engagement protrusion is constructed by a component different from the clamp member, its manufacturing becomes easy.

In accordance with the sixth invention, since the clamp member is constituted by a pair of symmetrical component parts, it becomes possible to make right and left diameter reduction amounts at the outer column substantially equal to each other.

In accordance with the seventh invention, since the clamp member is integrally formed, its management at the time of manufacturing becomes easy.

In accordance with the eighth invention, since the clamp member is arranged in such a way that it can move axially in respect to a vehicle fixed bracket, it becomes possible to adjust its telescopic position.

In accordance with the ninth invention, since a low frictional member for reducing a sliding resistance is present at a sliding surface between the outer column and the inner column, it becomes possible to adjust a telescopic position with a small force.

In accordance with the tenth invention, since both ends of the slit are closed, a variation in operating force of the operating lever becomes low, the outer column is deformed and a disturbance in inner diameter size of the outer column generated by the deformation is also reduced.

In accordance with the eleventh invention, since both ends of the slit are closed and at least one closed end is formed with a slit, and since a variation in operating force of the operating lever becomes low and a force for resiliently deforming the outer column becomes low, it is possible to restrict a force requisite for operating the operating lever low to a low value.

BRIEF DESCRIPTION OF THE DRAWINGS

FIG. 9 is a decomposed perspective view of FIG. 8.

FIG. 11 is a decomposed perspective view for showing the steering column device of a sixth preferred embodiment of the present invention.

FIG. 15 is a bottom view for showing the outer column to illustrate a modification of closed ends formed at both ends of the slit.

DETAILED DESCRIPTION OF THE PREFERRED EMBODIMENTS

Figure 1:
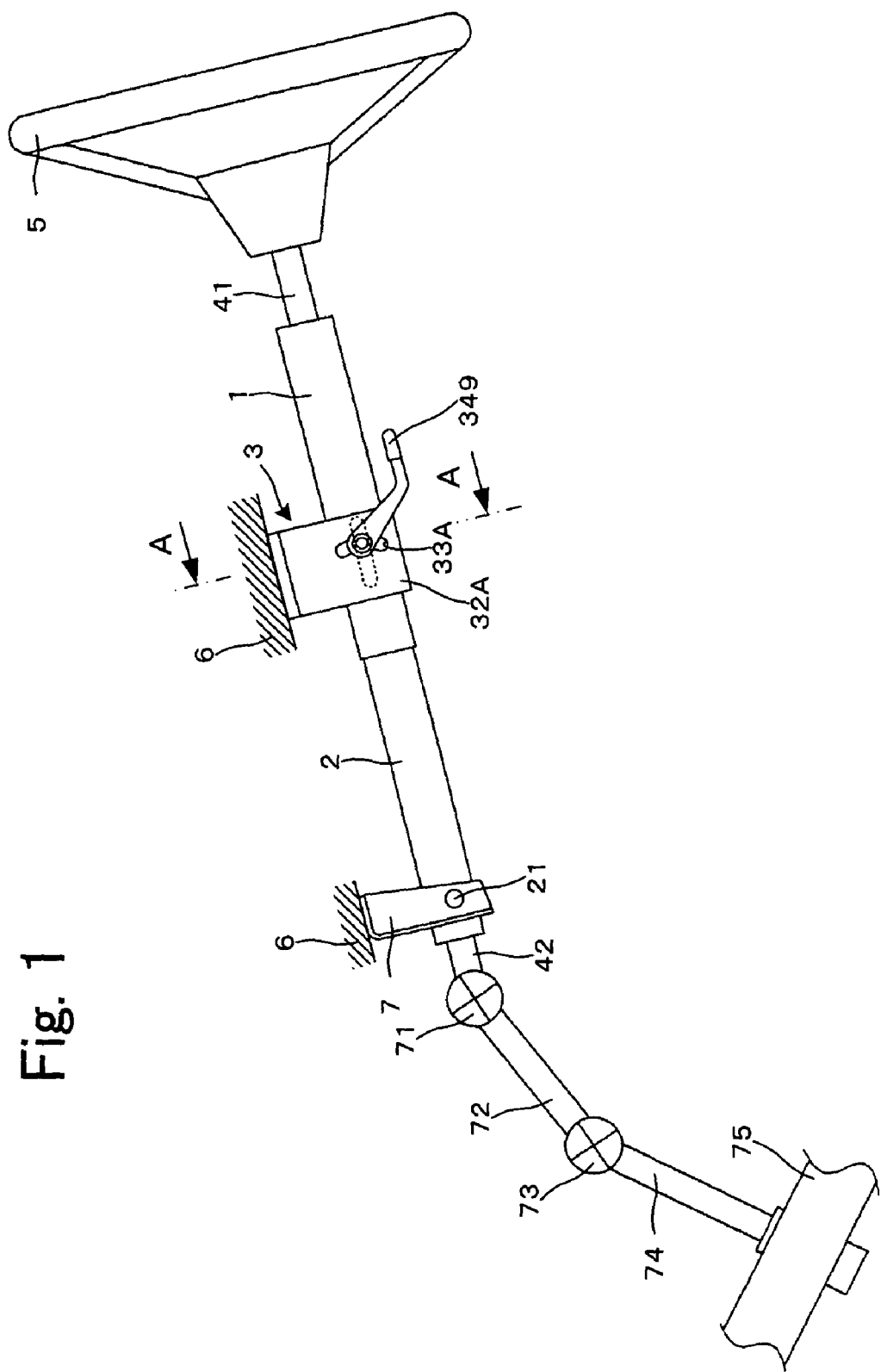
FIG. 1 is an entire view for showing a steering column device of the present invention.
Figure 2:
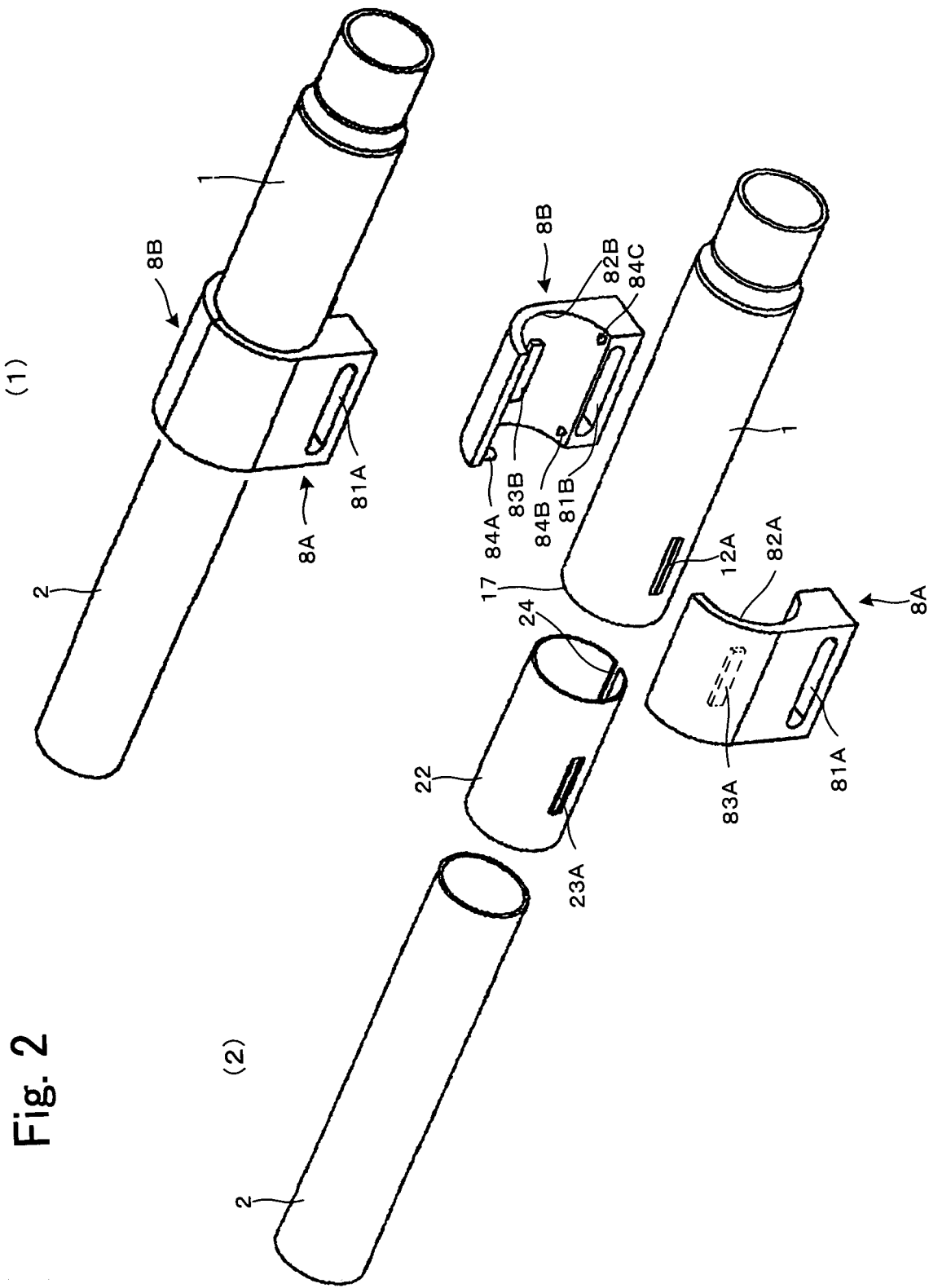
FIG. 2 shows a substantial part of the steering column device in accordance with a first preferred embodiment of the present invention, wherein (1) is a perspective view for showing an assembled state and (2) is a decomposed perspective view.
Figure 3:
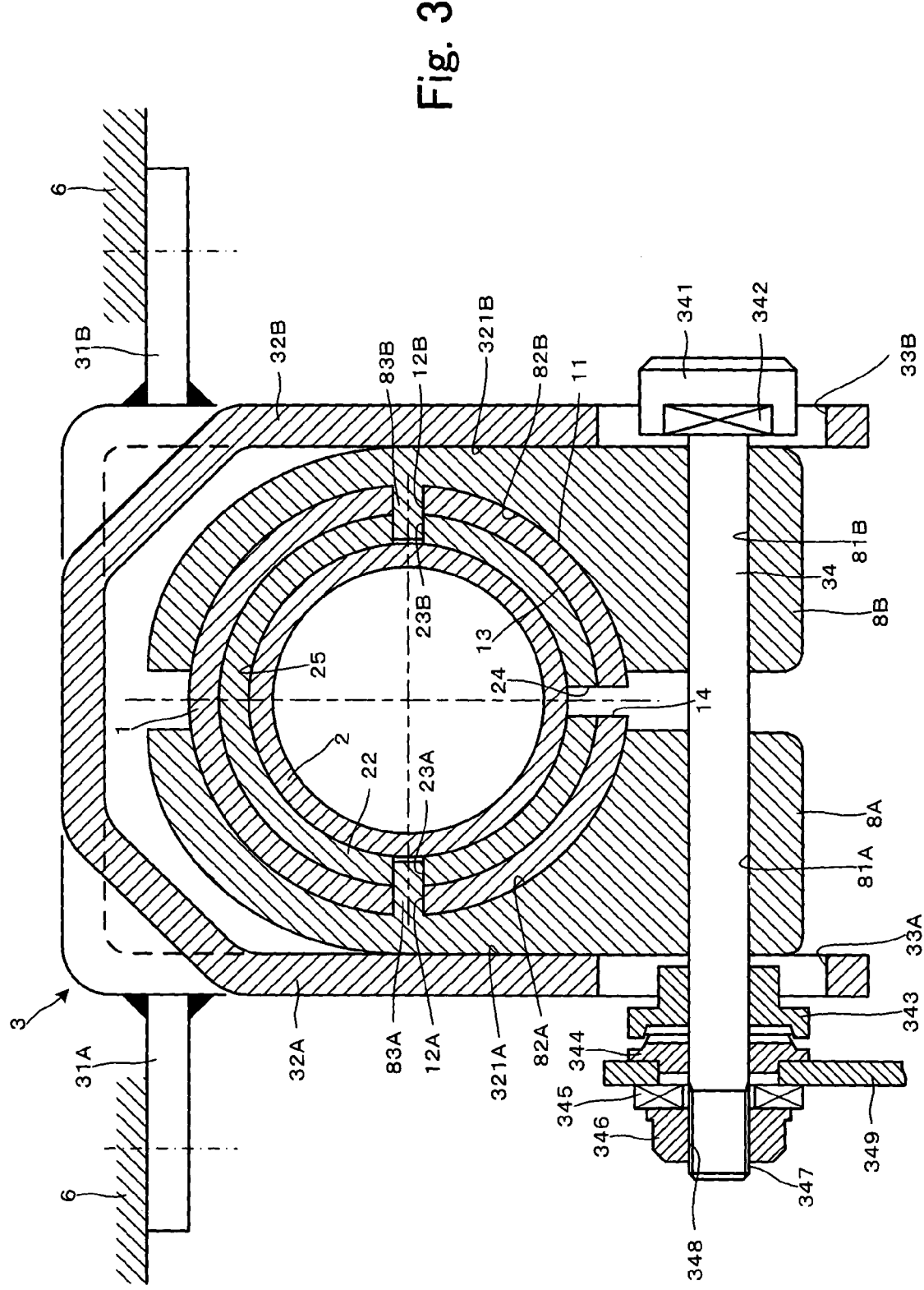
FIG. 3 is a longitudinal section of the steering column device in accordance with a first preferred embodiment of the present invention and this sectional view corresponds to a sectional view taken along line A-A of FIG. 1.

Referring now to the drawings, some preferred embodiments of the present invention will be described as follows. FIG. 1 is an entire view for showing a steering column device of the present invention. FIG. 2 shows a substantial part of the steering column device in accordance with a first preferred embodiment of the present invention, wherein (1) is a perspective view for showing an assembled state and (2) is a decomposed perspective view. FIG. 3 is a longitudinal section of the steering column device in accordance with a first preferred embodiment of the present invention and this sectional view corresponds to a sectional view taken along line A-A of FIG. 1.

As shown in FIG. 1, an upper steering shaft 41 having a steering wheel 5 fixed to a rear side of the vehicle body (the right side in FIG. 1) is rotatably supported in a hollow cylindrical outer column 1. An inner column 2 is axially and slidably fitted to a front side of the vehicle body (the left side in FIG. 1) of the outer column 1. The outer column 1 is fixed to a vehicle body 6 through an upper side vehicle body fixed bracket 3.

A lower side vehicle body fixed bracket 7 is fixed to a front side of the vehicle body of the inner column 2, and a tilt central shaft 21 fixed to the front side of the vehicle body of the inner column 2 is pivoted at the lower side vehicle body fixed bracket 7 in such a way that it can be tilted.

A lower steering shaft 42 is rotatably pivoted at the inner column 2. The lower steering shaft 42 is spline fitted to the upper steering shaft 41 such that a rotation of the upper steering shaft 41 is transmitted to the lower steering shaft 42.

The left end (with respect to the figure) of the lower steering shaft 42 is connected to the middle shaft 72 through an upper universal joint 71, and the left end (with respect to the figure) of the middle shaft 72 is connected to a pinion shaft 74 through a lower universal joint 73. The left end (with respect to the figure) of the pinion shaft 74 is connected to a steering gear 75, a rotation of the steering wheel 5 is transmitted to the steering gear 75 to enable a steering angle of wheels to be changed.

As shown in FIG. 3, the upper part of the upper vehicle body fixed bracket 3 is formed with a pair of right and left flanges 31A, 31B for use in fixing the upper vehicle body fixed bracket 3 to the vehicle body 6. A pair of right and left clamp members 8A, 8B are held at the inner surfaces 321A, 321B of the right and left side plates 32A, 32B (integrally formed with the flanges 31A, 31B and extending in a vertical direction) in such a way that they can be moved in a telescopic manner and tilted.

The clamp members 8A, 8B are symmetrical in respect to a vertical plane passing through a central axis of the outer column 1, and arcuate inner circumferential surfaces 82A, 82B formed in side the clamp members 8A, 8B hold an outer circumference 11 of the outer column 1. The clamp members 8A, 8B may be formed to have same shape that can be used whatever place they may be arranged. The clamp members 8A, 8B are formed by a die-casting method in which molten metal such as aluminum alloy and magnesium alloy or the like is press fitted into the dies while applying a pressure to them. It is preferable that if the clamp members 8A, 8B are formed by separate right and left elements, their machining work after casting can be omitted as compared with that of a case in which they are integrally formed.

Axial elongated rectangular engagement protrusions 83A, 83B on a horizontal line passing through a central axis of the outer column 1 are integrally formed at the arcuate inner circumferential surfaces 82A, 82B of the clamp members 8A, 8B. The engagement protrusions 83A, 83B are formed in a radial manner toward the center of the outer column 1. The outer circumference 11 of the outer column 1 is formed with engagement cavities 12A, 12B to pass through the inner circumference 13, and the engagement protrusions 83A, 83B of the clamp members 8A, 8B are fitted into engagement cavities 12A, 12B. Fitting among the engagement protrusions 83A, 83B and the engagement protrusions 12A, 12B may be carried out through any one of a press fitting or a clearance fitting.

A cylindrical bushing 22 formed by material having a low frictional coefficient is fitted to the inner circumference 13 of the outer column 1. Engagement protrusions 83A, 83B of the clamp members 8A, 8B are fitted into the engagement cavities 23A, 23B formed at the outer circumference of the bushing 22. The aforesaid inner column 2 can be axially and slidably fitted at the inner circumference of the bushing 22.

The outer column 1 and the bushing 22 are fixed to the clamp members 8A, 8B against their rotation through engagement among the engagement protrusions 83A, 83B and the engagement cavities 12A, 12B, 23A and 23B and at the same time when a position of the outer column 1 in respect to the inner column 2 is telescopically adjusted, the outer column 1, clamp members 8A, 8B and bushing 22 can be integrally and axially slid. Since the bushing 22 with a low frictional coefficient is present between the inner circumference 13 of the outer column 1 and the outer circumference 25 of the inner column 2, the outer column 1 can be moved with a light force against the inner column 2.

Axial elongated telescopic long grooves 81A, 81B (FIGS. 2 and 3) are formed at the clamp members 8A, 8B, and a fastening rod 34 is inserted from the right side as seen in FIG. 3 into the long grooves 33A, 33B for a tilt operation formed at the side plates 32A, 32B and also into the long grooves 81A, 81B for a telescopic operation. The long grooves 33A, 33B for a tilt operation are formed in an arcuate shape around the tilt center shaft 21.

As shown in FIG. 3, the right side of the fastening rod 34 is formed with a head 341 and the head 341 is abutted (not shown) against the outer side surface of the side plate 32B. The left outer diameter part of the head 341 is formed with a rotation stopper 342 having a rectangular section slightly narrower width than that of a groove width of the long groove 33B for a tilt operation. The rotation stopper 342 is fitted into the long groove 33B for a tilt operation to fix a rotation of the fastening rod 34 against the upper side vehicle body fixing bracket 3 and at the same time slides the fastening rod 34 along the long groove 33B for a tilt operation when a tilt position is adjusted.

A fixed cam 343, movable cam 44, thrust bearing 345 and adjustment nut 346 are outwardly fitted to the left end outer circumference of a fastening rod 34 in this sequence. A female thread 348 formed at the inner diameter part of the adjustment nut 346 is screwed into a male thread 347 formed at the left end of the fastening rod 34. An operating lever 349 is fixed to the left end surface of the movable cam 344, and a cam lock mechanism is constituted by a movable cam 344 integrally operated by this operating lever 349 and the fixed 343. The fixed cam 343 is engaged with the long groove 33A for a tilting operation and is not rotated in respect to the upper side vehicle body fixing bracket 3 and when the tilting position is adjusted, the fixed cam 343 is slid along the long groove 33A for a tilting operation.

When the operating lever 349 is turned when a tilting and telescopic fastening operation is carried out, a protrusion of the fixed cam 343 rides over a protrusion of the movable cam 344 to push the fixed cam 343 to the right side shown in FIG. 3 and concurrently the fastening rod 34 is pulled leftward to fasten the side plates 32A, 32B and further fasten the clamp members 8A, 8B. When the clamp members 8A, 8B are fastened, a diameter of the outer column 1 is efficiently reduced because the arcuate inner circumferential surfaces 82A, 82B of the clamp members 8A, 8B hold the outer circumference 11 of the outer column 1.

When the tilting telescopic releasing operation is carried out, the operation lever 349 is turned in an opposite direction, a bottom part of the movable cam 344 enters into the protrusion of the fixed cam 343 to release a force for pushing the fixed cam 343 to the right side and at the same time to release a force for pulling the fastening rod 34 to the left side, thereby the side plates 32A, 32B are spaced apart and the fastening of the clamp members 8A, 8B is released. With this operation, the outer column 1 and the clamp members 8A, 8B can be clamped or unclamped against the upper vehicle body fixing bracket 3 at a desired tilting telescopic position.

Each of the slits 14, 24 is formed at the lower surfaces of the outer column 1 and the bushing 22. The slit 24 of the bushing 22 is formed over an entire axial length of the bushing 22. In addition, the slit 14 of the outer column 1 is formed at the vehicle front side end surface 17 of the outer column 1. However, the vehicle front side end of the slit 14 of the outer column 1 may be closed, and the slit 14 may be formed only in an axial range where the clamp members 8A, 8B are contacted with the outer column 1.

The aforesaid clamp members 8A, 8B are arranged at positions where the slits 14, 24 are held from both sides. Accordingly, when the clamp members 8A, 8B are fastened, the diameters of the outer column 1 and the bushing 22 are reduced to enable the inner clamp 2 to be held by a strong clamp force.

After the clamp members 8A, 8B and the outer column 1 are unclamped against the upper side vehicle body fixing bracket 3, the steering wheel 5 is held to cause the outer column 1 to be axially slid against the inner column 2 to adjust them at the desired tilting position and concurrently after it is adjusted to the desired tilting position around the tilting center shaft 21, the clamp members 8A, 8B are clamped against the upper side vehicle body fixing bracket 3.

As shown in FIG. 2, the column-like engagement protrusions 84A, 84B and 84C are formed above and below the arcuate inner circumferential surface 82B of the right side clamp member 8B in addition to the aforesaid engagement protrusion 83B. If the column-like engagement protrusions 84A, 84B and 84C are engaged with non-illustrated circular engagement cavities formed at the outer column 1, it is preferable because a holding force at the time of assembling the clamp member 8B and the outer column 1 is improved and their looseness can be reduced. Also as to the left side clamp member 8A, a similar additional column-like engagement protrusion (not shown) can be formed.

Although the bushing 22 having a low frictional coefficient is placed in the aforesaid first preferred embodiment, it may also be applicable that the bushing 22 is not placed and material having a low frictional coefficient is coated on at least one of the sliding surfaces of the outer column 1 and the inner column 2 slidably contacted to each other.

In addition, although the engagement protrusions 83A, 83B are formed on a horizontal line passing through the central axis of the outer column 1 in the aforesaid first preferred embodiment, it is possible that the engagement protrusions are formed at optional phase positions. Further, although each of the engagement protrusions 83A, 83B is formed one by one at each of the clamp members 8A, 8B, a plurality of engagement protrusions may be formed. In addition, although the engagement protrusions 83A, 83B have an axial elongated rectangular shape, they may be formed like a column-like protrusion with short axial length and a protrusion elongated in a vertical line direction to have an optional shape.

Figure 4:
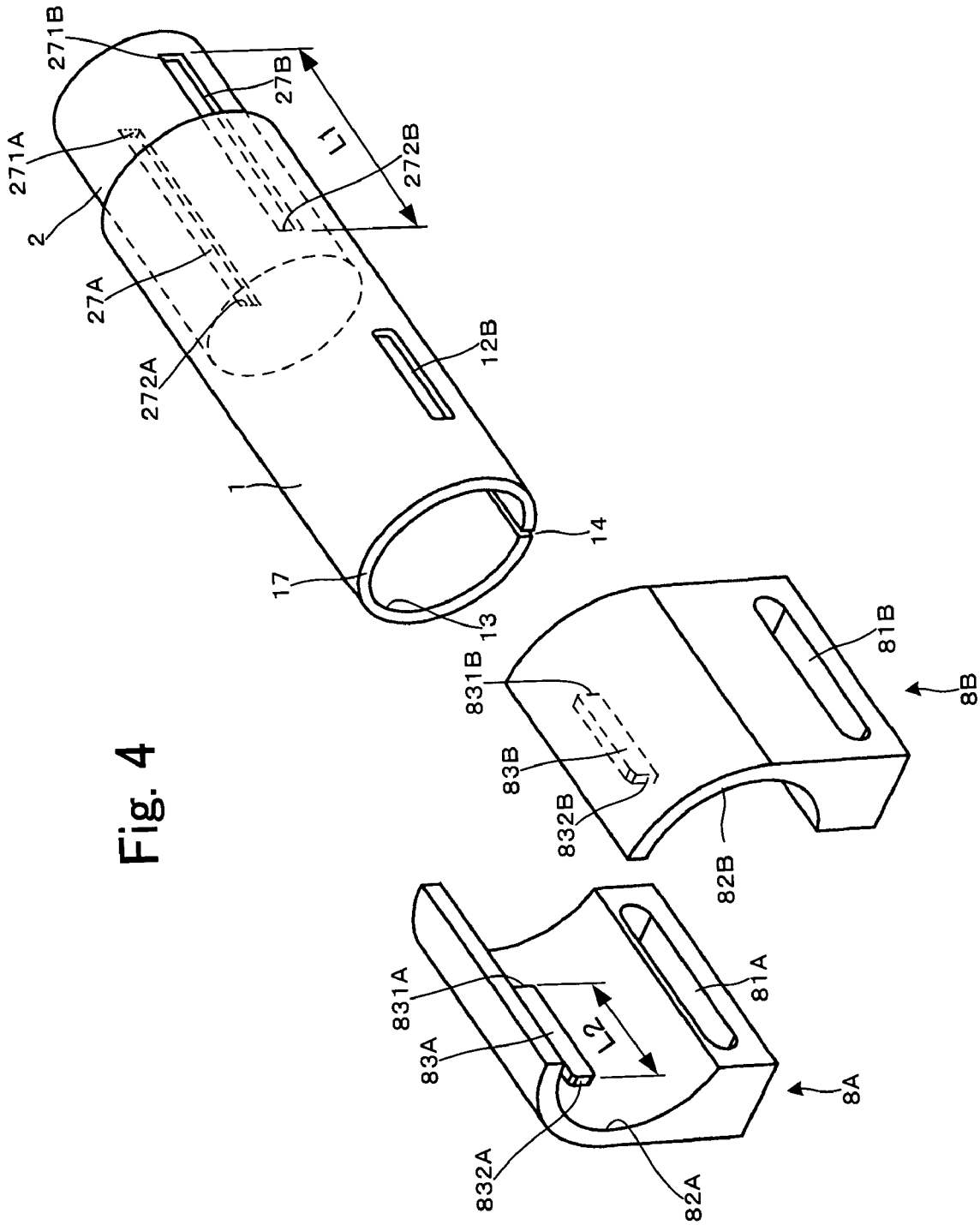
FIG. 4 is a decomposed perspective view for showing a substantial part of the steering column device in accordance with a second preferred embodiment of the present invention.
Figure 5:
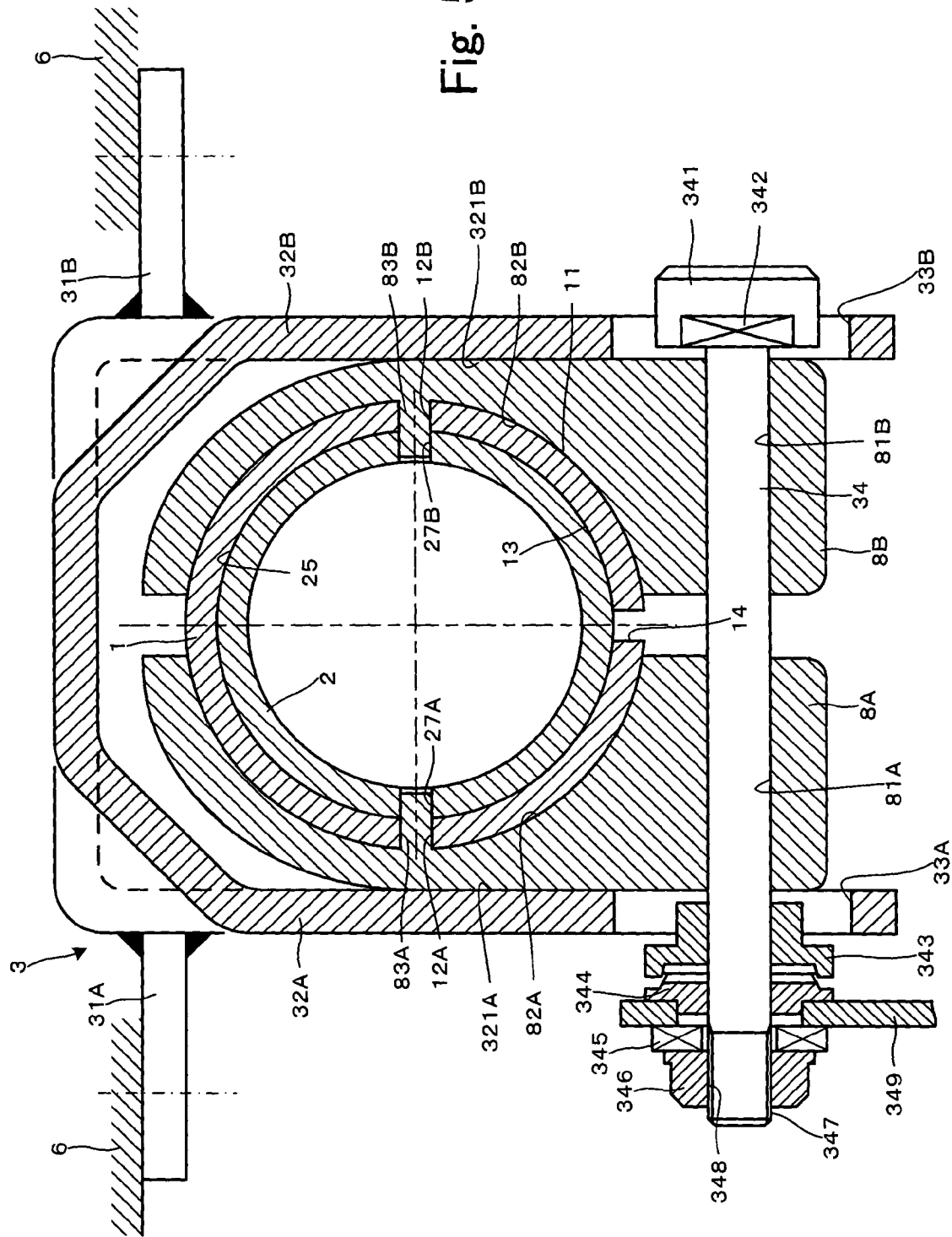
FIG. 5 is a longitudinal section of the steering column device of the second preferred embodiment of the present invention and this sectional view corresponds to a sectional view taken along line A-A of FIG. 1.

Next, a steering column device of a second preferred embodiment of the present invention will be described as follows. FIG. 4 is a decomposed perspective view for showing a substantial part of the steering column device of the second preferred embodiment of the present invention. FIG. 5 is a longitudinal section for showing the steering column device of the second preferred embodiment and this view corresponds to a section taken along line A-A of FIG. 1. In the following description, only the structural portions different from those of the first preferred embodiment will be described and their overlapped description will be omitted.

The steering column device of the second preferred embodiment is a preferred embodiment in which the bushing 22 of the first preferred embodiment is omitted, the inner column 2 is formed with engagement cavities, and axial ends of the engagement protrusions 83A, 83B are abutted against the axial ends of the engagement cavities of the inner column 2 and act as stoppers when the telescopic adjustment is carried out.

That is, as shown in FIGS. 4 and 5, the outer circumference 25 of the inner column 2 is fitted to the inner circumference 13 of the outer column 1 in such a way that it can be axially slid, and the engagement protrusions 83A, 83B of the clamp members 8A, 8B are fitted to the engagement cavities 27A, 27B formed at the outer circumference 25 of the inner column 2. An axial length L1 of the engagement cavities 27A, 27B is set to a length in which a telescopic adjustment distance of the outer column 1 is added to an axial length L2 of the engagement protrusions 83A, 83B of the clamp members 8A, 8B.

Accordingly, the outer column 1 and the inner column 2 are prevented from being rotated against the clamp members 8A, 8B through engagement among the engagement protrusions 83A, 83B and the engagement cavities 12A, 12B, 27A and 27B and at the same time when the outer column 1 is adjusted for its telescopic position against the inner column 2, the outer column 1 and the clamp members 8A, 8B can be integrally slid in an axial direction.

When they reach up to the stroke end of the telescopic adjustment, axial ends 831A, 831B (front side of the vehicle body) or 832A, 832B (rear side of the vehicle body) of the engagement protrusions 83A, 83B of the clamp members 8A, 8B are abutted against the axial ends 271A, 271B (front side of the vehicle body) or 272A, 272B (rear side of the vehicle body) of the engagement cavities 27A, 27B to act as stoppers applied when the telescopic adjustment is carried out.

In the aforesaid second preferred embodiment, the engagement protrusions 83A, 83B and the engagement cavities 27A, 27B act as stoppers when the telescopic adjustment is carried out, so that their structure becomes simple and their manufacturing cost can be reduced. In the aforesaid preferred embodiment, material having a low frictional coefficient may also be coated on at least one of the sliding surfaces where the outer column 1 and the inner column 2 are slidingly contacted to each other.

Figure 6:
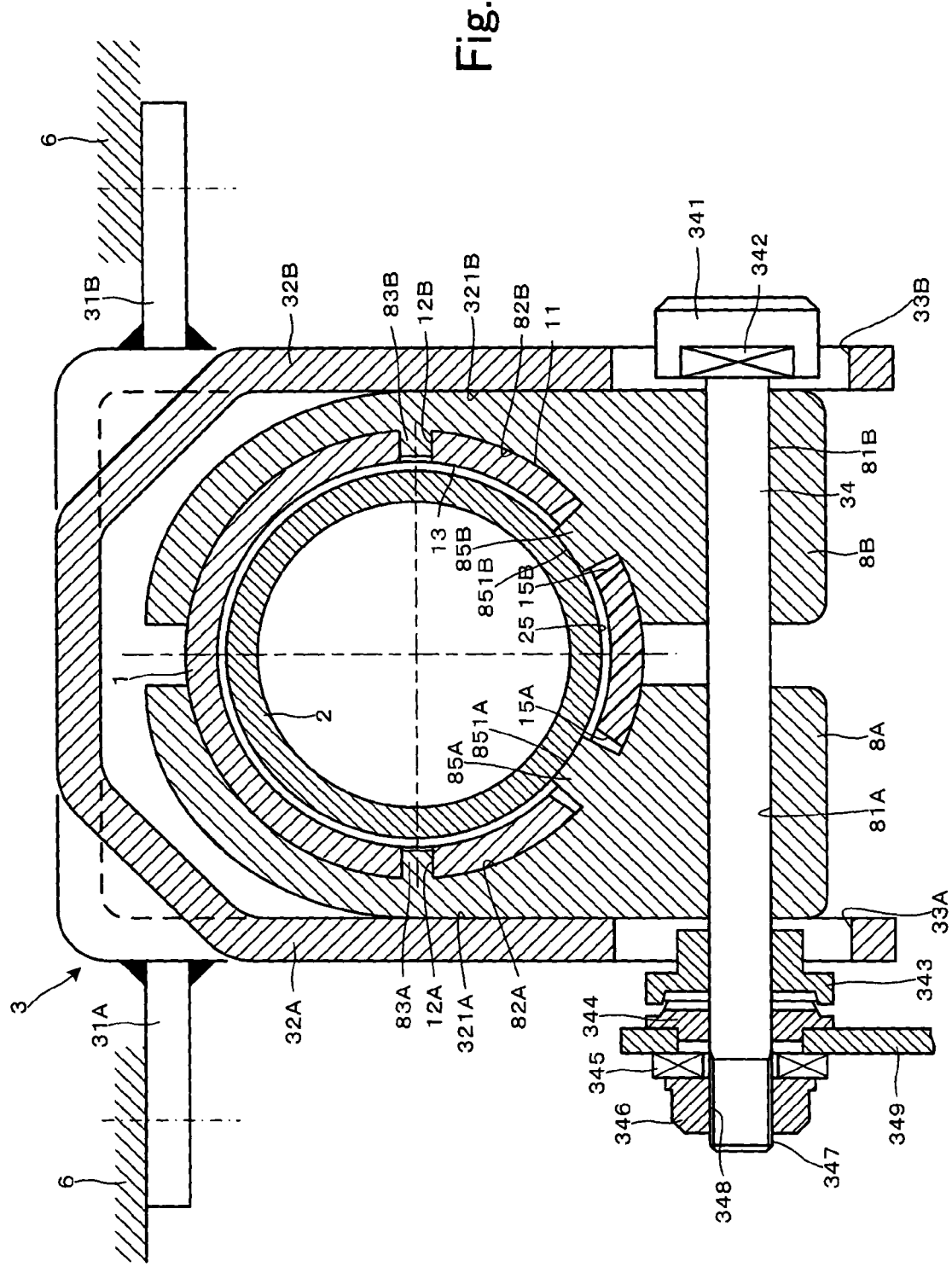
FIG. 6 is a longitudinal section of the steering column device of a third preferred embodiment of the present invention taken along line A-A of FIG. 1.

Next, a steering column device of a third preferred embodiment of the present invention will be described as follows. FIG. 6 is a longitudinal section for showing the steering column device of the third preferred embodiment of the present invention and this section corresponds to a section taken along line A-A of FIG. 1. In the following description, only the structural portions different from those of the aforesaid preferred embodiment will be described and their overlapped description will be omitted.

A steering column device of a third preferred embodiment is a preferred embodiment in which the inner column 2 is directly clamped by the depressing protrusions arranged at the clamp members 8A, 8B.

That is, as shown in FIG. 6, axial elongated wedge-shaped depressing protrusions 85A, 85B are integrally formed below the engagement protrusions 83A, 83B at the arcuate inner circumferential surfaces 82A, 82B of the clamp members 8A, 8B. Slits 15A, 15B wider than the depressing protrusions 85A, 85B elongated axially are formed to pass through the inner circumference 13 at the outer circumference 11 of the outer column 1, and the depressing protrusions 85A, 85B are loosely fitted to the slits 15A, 15B.

When an operating lever 349 is turned at the time of tilting telescopic fastening and the clamp members 8A, 8B are fastened, the outer circumference 11 of the outer column 1 is fastened by the arcuate inner circumferential surfaces 82A, 82B of the clamp members 8A, 8B and concurrently the arcuate depressing surfaces 851A, 851B at the extremity ends of the depressing protrusions 85A, 85B are abutted against the outer circumference 25 of the inner column 2. As a result, the outer column 1 and the inner column 2 are abutted to each other at their upper surfaces to enable the inner column 2 to be clamped in a telescopic non-slidable manner.

When the operating lever 349 is turned in an opposite direction at the time of releasing the tilting telescopic operation and the fastening of the clamp members 8A, 8B is released, the fastening of the clamp members 8A, 8B against the outer column 1 is released and concurrently the arcuate depressing surfaces 851A, 851B at the extremity ends of the depressing protrusions 85A, 85B are moved away from the outer circumference 25 of the inner column 2 to enable a clamped state of the inner column 2 to be released.

In the aforesaid third preferred embodiment, the inner column 2 can be clamped positively because the outer circumference of the inner column 2 is directly clamped by the depressing protrusions 85A, 85B. In addition, in the aforesaid third preferred embodiment, a clamping force can be increased further if a diameter of the outer column 1 is reduced and the outer circumference 25 of the inner column 2 is clamped with the inner circumference 13 of the outer column 1.

In the aforesaid third preferred embodiment, the depressing protrusions 85A, 85B may be formed of a cylindrical protrusion or an axial elongated rectangular protrusion. In addition, it may also be applicable that the outer column 1 may be formed with a slit and a diameter of the outer column 1 is reduced at the time of clamping of the inner column 2.

Figure 7:
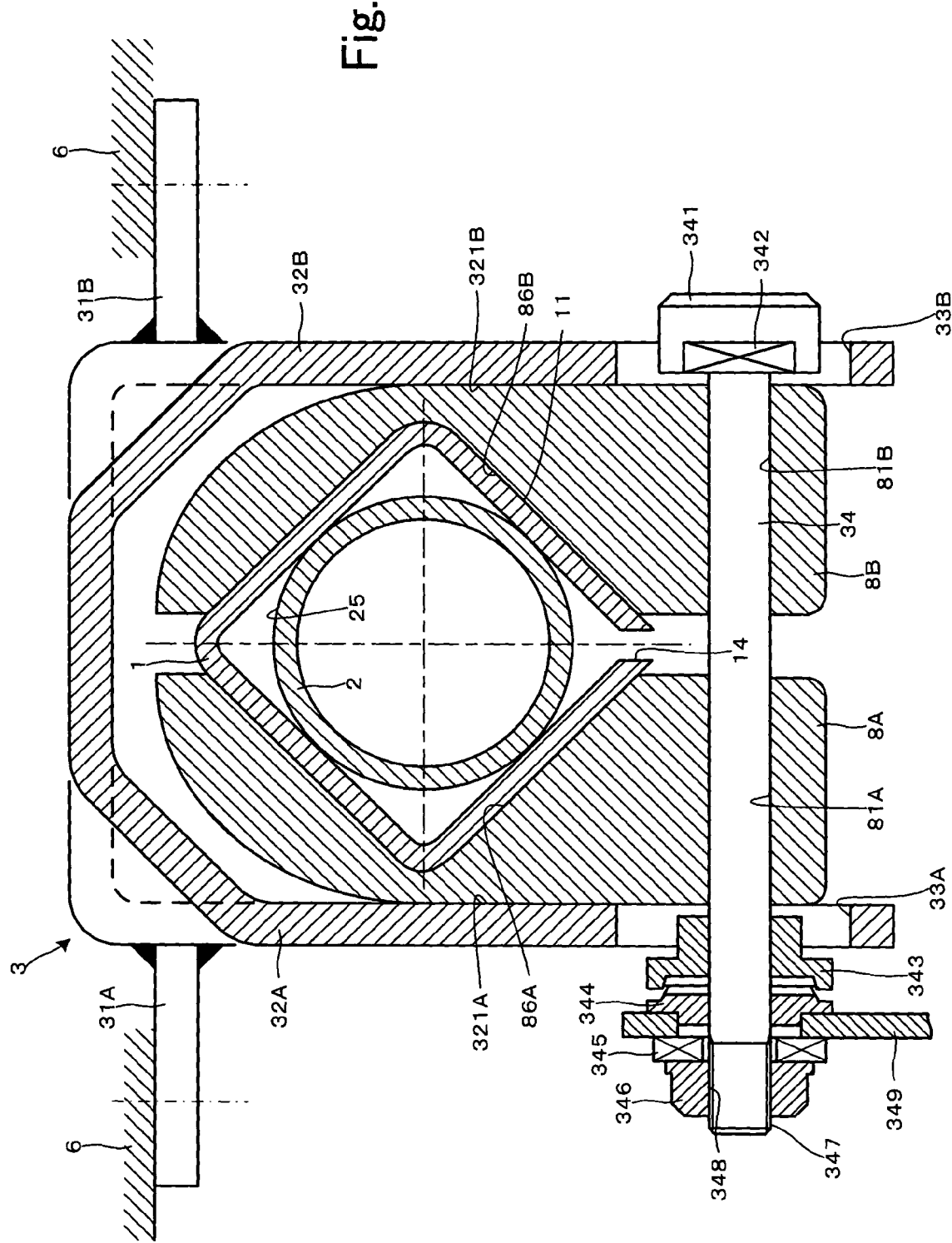
FIG. 7 is a longitudinal section of the steering column device of a fourth preferred embodiment of the present invention and this sectional view corresponds to a sectional view taken along line A-A of FIG. 1.

Next, a steering column device of a fourth preferred embodiment of the present invention will be described as follow. FIG. 7 is a longitudinal section for showing the steering column device of the fourth preferred embodiment of the present invention and this figure corresponds to a section taken along line A-A of FIG. 1. In the following description, only the structural portions different from those of the aforesaid preferred embodiment will be described and the overlapped description will be omitted.

The steering column device of the fourth preferred embodiment is a preferred embodiment in which the outer column 1 is stopped against rotation to the clamp members 8A, 8B by forming a sectional shape of the outer column 1 through hydroforming.

That is, as shown in FIG. 7, the outer column 1 is formed into a rectangular hollow pipe and the rectangular outer circumference 11 is held by the <-shaped inner circumferential surfaces 86A, 86B formed at the clamp members 8A, 8B. The outer column 1 is stopped against rotation to the clamp members 8A, 8B through engagement among the <-shaped inner circumferential surfaces 86A, 86B and the rectangular outer circumference 11. When the outer column 1 is adjusted for its telescopic position against the inner column 2, the outer column 1 is guided by the clamp members 8A, 8B and slides axially. The inner circumference of the outer column 1 is contacted with the outer circumference of the inner column 2 at four points.

In the aforesaid fourth preferred embodiment, it is not necessary to form in particular the engagement protrusions 83A, 83B and engagement cavities 12A, 12B of the aforesaid preferred embodiment at the clamp members 8A, 8B and the outer column 1, so that a structure of the clamp members 8A, 8B and the outer column 1 becomes simple and its manufacturing cost can be reduced. In addition, although the inner column 2 has a cylindrical shape in the aforesaid fourth preferred embodiment, it may be formed into a rectangular hollow pipe in compliance with a rectangular section of the outer column 1. In the aforesaid fourth preferred embodiment, although the outer column 1 is formed into a rectangular shape, its shape may be of a polygonal shape such as a hexagonal shape or octagonal shape and the like.

Figure 8:
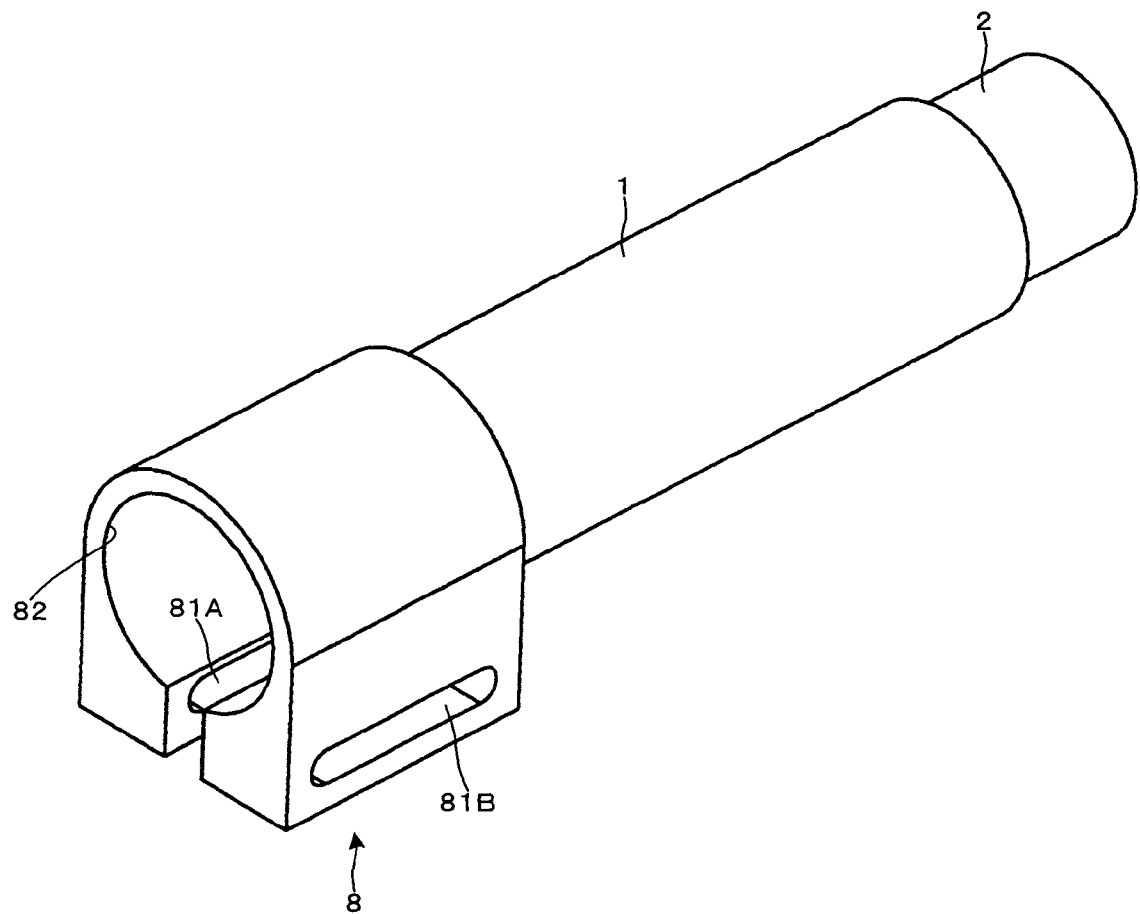
FIG. 8 is a perspective view for showing an assembled state of a substantial part of a steering column device of a fifth preferred embodiment of the present invention.
Figure 10:
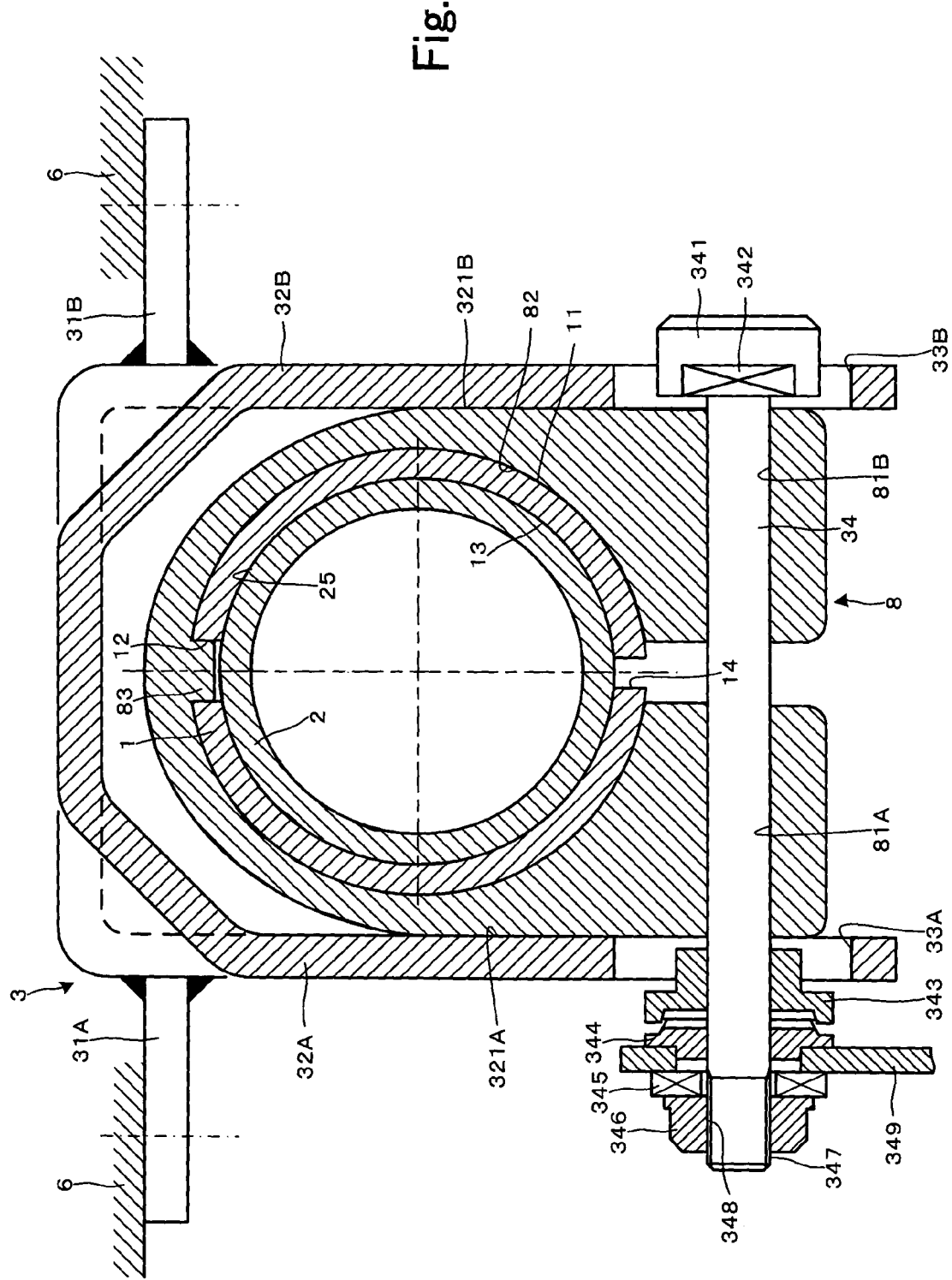
FIG. 10 is a longitudinal section of the steering column device of a fifth preferred embodiment of the present invention and this sectional view corresponds to a sectional view taken along line A-A of FIG. 1.

Next, a steering column device of a fifth preferred embodiment of the present invention will be described. FIG. 8 is a perspective view for showing an assembled state of a substantial part of the steering column device of the fifth preferred embodiment of the present invention. FIG. 9 is a decomposed perspective view for showing a substantial part of the steering column device of the fifth preferred embodiment of the present invention. FIG. 10 is a longitudinal section for showing the steering column device of the fifth preferred embodiment and this view corresponds to a section taken along line A-A of FIG. 1. In the following description, only the structural portions different from those of the aforesaid preferred embodiment will be described and their overlapped description will be omitted.

The steering column device of the fifth preferred embodiment is a preferred embodiment in which a clamp member is integrally formed and the number of each of the engagement protrusion of the clamp member and the engagement cavity of the outer column 1 is one. The clamp member 8 is integrally formed by a die-casting process and the arcuate inner circumferential surface 82 formed inside the clamp member 8 holds the outer circumference 11 of the outer column 1.

At the arcuate inner circumferential surface 82 of the clamp member 8, an axial elongated rectangular engagement protrusion 83 is integrally formed at the upper side of a vertical line passing through the central axis of the outer column 1. At the outer circumference 11 of the outer column 1, one engagement cavity 12 is formed to pass through the inner circumference 13, and the engagement protrusion 83 of the clamp member 8 is fitted into the engagement cavity 12.

In the aforesaid fifth preferred embodiment, the number of component elements can be reduced because the clamp member 8 can be integrally formed and a structure of the clamp member 8 and the outer column 1 becomes simple because the number of each of the engagement protrusion 83 and the engagement cavity 12 is one, reducing the manufacturing cost. In the aforesaid fifth preferred embodiment, although the slit 14 of the outer column 1 is formed at the vehicle body front side end surface 17 of the outer column 1, the vehicle body front side end of the slit 14 may be closed and the slit 14 may be formed only in a range where the clamp member 8 is contacted with the outer column 1. In addition, the engagement protrusions 83 may be arranged at both right and left sides on a horizontal line passing through a center axis of the outer column 1.

Next, a steering column device of a sixth preferred embodiment of the present invention will be described as follows. FIG. 11 is a decomposed perspective view for showing a substantial part of the steering column device of the sixth preferred embodiment of the present invention. In the following description, only the structural portions different from those of the aforesaid preferred embodiment will be described and their overlapped description will be omitted.

The steering column device of the sixth preferred embodiment is a preferred embodiment in which the clamp member is integrally formed and the engagement protrusion of the clamp member is made separate from the clamp member. The clamp member 8 is integrally formed by a die-casting process and the arcuate inner circumferential surface 82 formed inside the clamp member 8 holds the outer circumference 11 of the outer column 1.

One elongated axial rectangular-shaped engagement groove 87 is formed at the clamp member 8 above a vertical line passing through the center axis of the outer column 1 and a rectangular parallelepiped engagement key 88 formed by a separate component element is press fitted into the engagement groove 87 and fixed there. At the outer circumference 11 of the outer column 1, one engagement cavity 12 is formed at the inner circumference 13 while being passed through it, the inside part of the press fitted engagement key 88 is protruded inward from the arcuate inner circumference 82 and further fitted into the engagement cavity 12. The number of the engagement key 88 is not limited to one, but two engagement keys may be arranged at both right and left sides on a horizontal line passing through a central axis of the outer column 1.

In the aforesaid sixth preferred embodiment, the clamp member 8 can be integrally formed and it is sufficient that the number of each of the engagement key 88 and engagement cavity 12 is one, so that the structure of the clamp member 8 and outer column 1 becomes simple and their manufacturing cost can be reduced.

Although the slit 14 of the outer column 1 in the aforesaid sixth preferred embodiment is formed at the vehicle body front side end surface 17 of the outer column 1, it may also be applicable that the vehicle body front side end of the slit 14 is closed and the slit 14 is formed only at a range where the clamp member 8 is contacted with the outer column 1.

Figure 12:
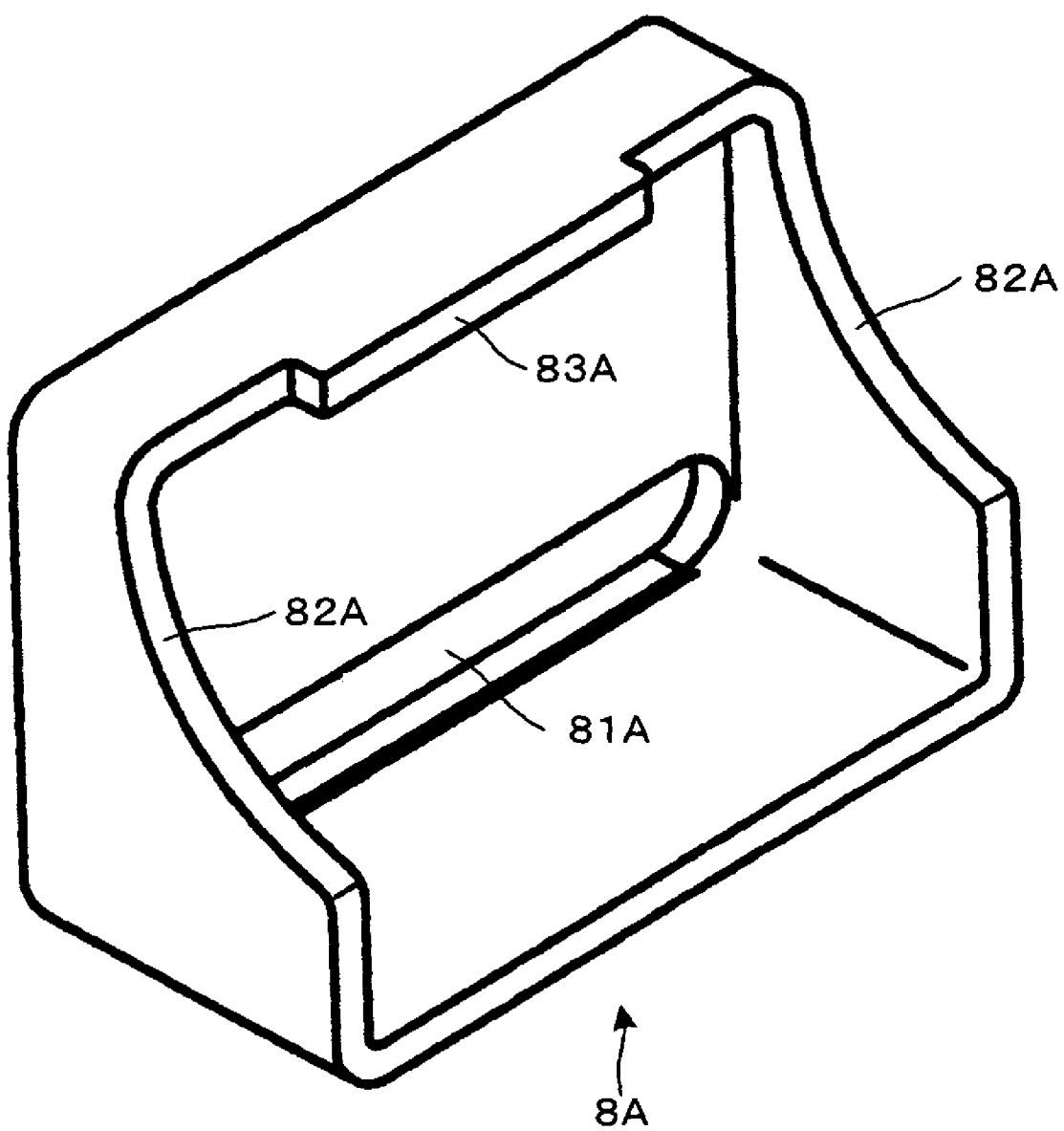
FIG. 12 is a perspective view for showing a single clamp member of a steering column device of a seventh preferred embodiment of the present invention.

Next, a steering column device of a seventh preferred embodiment of the present invention will be described as follows. FIG. 12 is a decomposed perspective view for showing a single clamp member of the seventh preferred embodiment of the present invention. In the following description, only the structural portions different from those of the aforesaid preferred embodiment will be described and their overlapped description will be omitted.

The steering column device of the seventh preferred embodiment is a preferred embodiment in which the clamp member is formed through pressing and FIG. 12 shows the left clamp member of a pair of right and left clamp members. The left clamp member 8A is formed by pressing a sheet plate, and the arcuate inner circumferential surfaces 82A, 82A formed inside the clamp member 8A hold the outer circumference of the outer column.

Elongated axial rectangular-shaped engagement protrusion 83A is integrally formed at the upper part of the arcuate inner circumferential surface 82A, and this engagement protrusion 83A is fitted into the engagement cavity formed at the outer circumference of the outer column.

In the aforesaid seventh preferred embodiment, since the clamp member is formed by pressing a sheet plate, a light weight formation of the clamp member can be realized.

Figure 13:
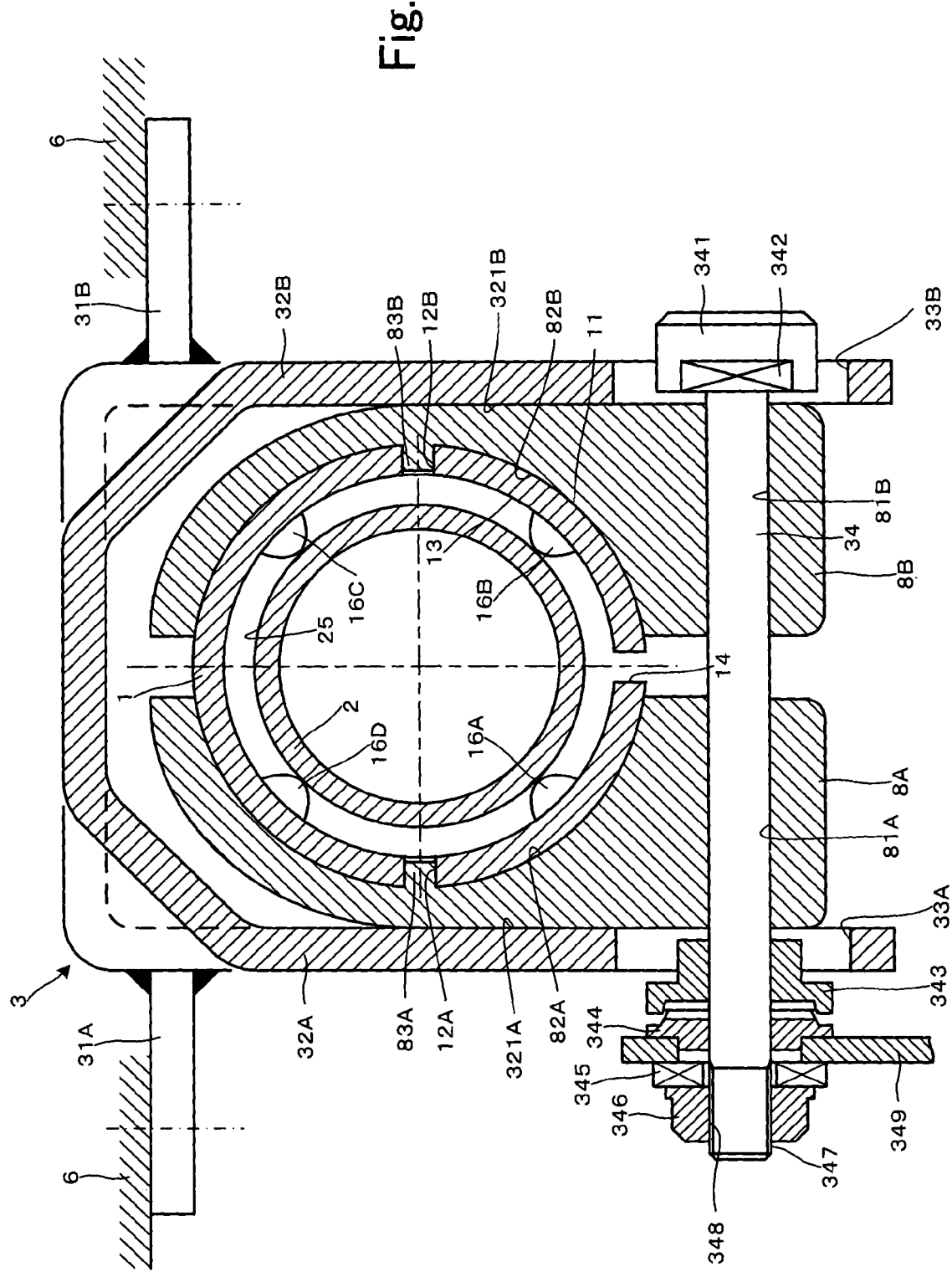
FIG. 13 is a longitudinal section for showing a steering column device of an eighth preferred embodiment of the present invention and this sectional view corresponds to a sectional view taken along line A-A of FIG. 1.

Next, a steering column device of an eighth preferred embodiment of the present invention will be described as follows. FIG. 13 is a longitudinal section for showing the steering column device of the eighth preferred embodiment of the present invention and this figure corresponds to a section taken along line A-A of FIG. 1. In the following description, only the structural portions different from those of the aforesaid preferred embodiment will be described and their overlapped description will be omitted.

The steering column device of the eighth preferred embodiment is a preferred embodiment in which the inner column 2 is clamped by the depressing protrusions 16A, 16B, 16C and 16D arranged at the inner circumference 13 of the outer column 1. That is, as shown in FIG. 13, four depressing protrusions 16A, 16B, 16C and 16D are equally spaced apart on the circumference at the inner circumference 13 of the outer column 1 and they are formed to protrude toward the center of the outer column 1.

The depressing protrusions 16A, 16B, 16C and 16D are formed into substantial semi-spherical shape and these plural protrusions are axially arranged at the outer column 1. It is satisfactory that an axial range where the depressing protrusions 16A, 16B, 16C and 16D are arranged is set to such a range as one where the clamp members 8A, 8B are contacted with the outer column 1. In addition, a shape of each of the depressing protrusions 16A, 16B, 16C and 16D may be an axial elongated shape of the outer column 1.

When an operating lever 349 is turned to fasten clamp members 8A, 8B at the time of tilting telescopic fastening operation, the outer circumference 11 of the outer column 1 is fastened by the arcuate inner circumferential surfaces 82A, 82B of the clamp members 8A, 8B, the extremity ends of the depressing protrusions 16A, 16B, 16C and 16D strongly depress against the outer circumference 25 of the inner column 2 to enable the inner column 2 to be clamped in such a way that it may not be telescopically slid.

When the operating lever 349 is turned in an opposite direction at the time of releasing the tilting telescopic operation and the fastening of the clamp members 8A, 8B is released, a force of the extremity ends of the depressing protrusions 16A, 16B, 16C and 16D depressing against the outer circumference 25 of the inner column 2 becomes weak in concurrent with releasing of the fastening of the clamp members 8A, 8B against the outer column 1, and then the clamping of the inner column 2 can be released.

Although four depressing protrusions 16A, 16B, 16C and 16D are arranged in the aforesaid eighth preferred embodiment, it is satisfactory if more than three depressing protrusions are installed. In addition, it may also be applicable that the depressing protrusions 16A, 16B, 16C and 16D are protruded and formed at the outer circumference 25 of the inner column 2 and protruded from the center of the inner column 2 toward outside and the extremity ends of the depressing protrusions 16A, 16B, 16C and 16D are abutted against the inner circumference 13 of the outer column 1. Additionally, although each of the depressing protrusions is arranged in an equal spaced-apart relation on the circumference in this preferred embodiment, it is not always necessary to arrange them on the circumference in an equal spaced-apart relation.

Figure 14:
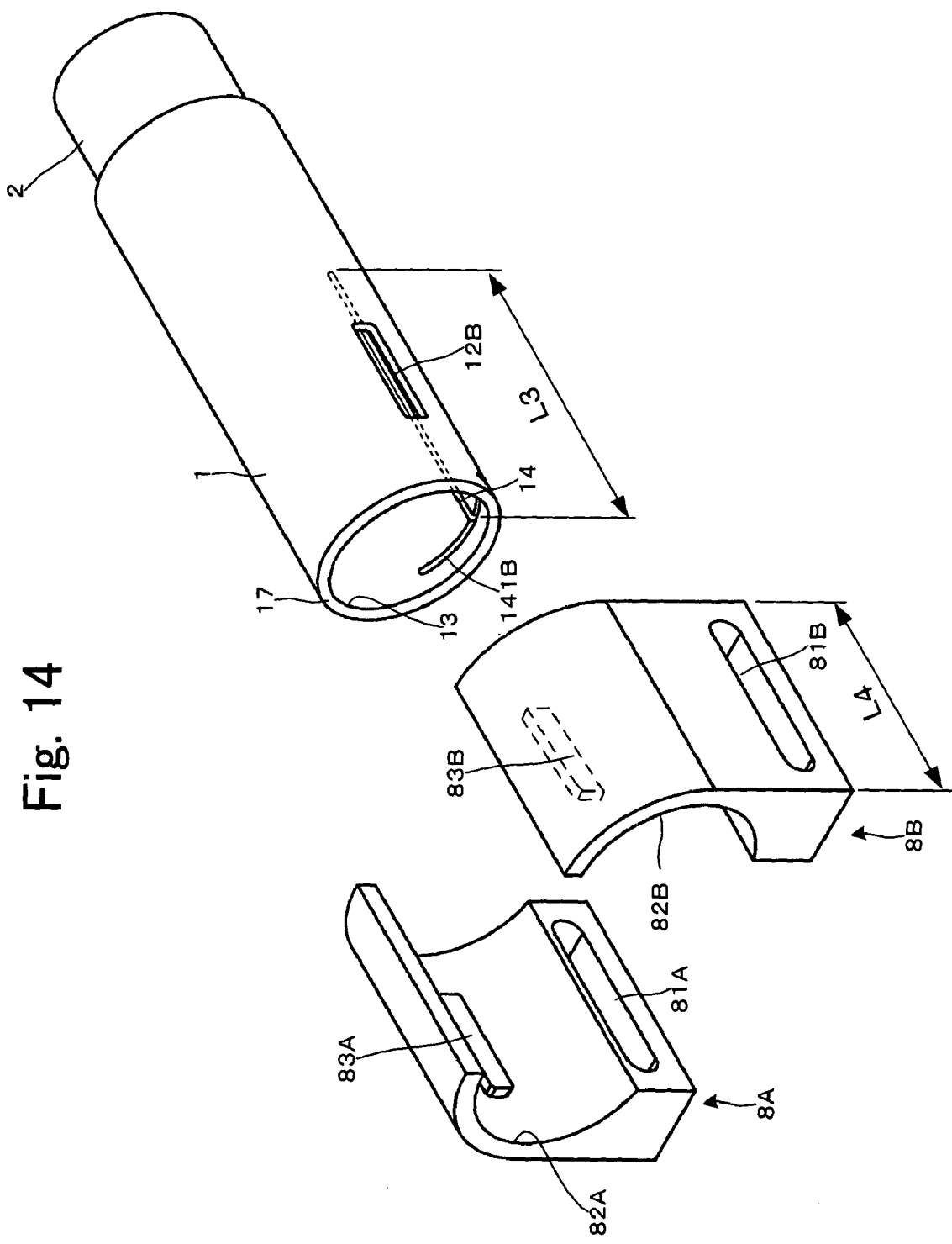
FIG. 14 is a decomposed perspective view for showing the substantial part of the steering column device of a ninth preferred embodiment of the present invention.

Next, a steering column device of a ninth preferred embodiment of the present invention will be described as follows. FIG. 14 is a decomposed perspective view for showing a substantial part of the steering column device of the ninth preferred embodiment of the present invention. FIG. 15 is a bottom view for showing the outer column to illustrate a modification of the closed ends formed at both ends of the slit. In the following description, only the structural portions different from those of the aforesaid preferred embodiment will be described and their overlapped description will be omitted.

The slit formed at the outer column of the prior art steering column device is released to the end surface of the outer column at its axial one end. Accordingly, when the outer column is tried to be clamped at the vehicle body upper bracket, a force requisite for making a resilient deformation of the outer column at the slit portion is made widely different in response to the telescopic position of the outer column. That is, the nearer the closed end of the slit, the larger a force requisite for resiliently deforming the outer column at the slit portion. Accordingly, a variation in operating force for the telescopic operating lever is increased.

However, when both ends of the slit are closed for reducing variation in the operating force of the operating lever, a force requisite for resiliently deforming the outer column is increased, so that it becomes necessary to generate a strong force for operating the operating lever.

FIG. 15(4) is a view taken from below to illustrate the outer column 1 in FIG. 14. That is, in the steering column device in the ninth preferred embodiment, as shown in FIG. 14 and FIG. 15(4), the vehicle body front side end (the left side in FIG. 14 and FIG. 15(4)) of the slit 14 is not released at the vehicle body front side end surface 17 of the outer column 1 and a closed end 141B cut at a right angle in respect to the slit 14 is formed. Then, the closed end 141B is cut up by about a substantial half of an outer diameter of the outer column 1. In addition, the vehicle body rear end (the right side of FIG. 14 and FIG. 15(4)) of the slit 14 extends up to a substantial intermediate position of an axial length of the outer column 1 to form a semi-arcuate closed end 142D.

As illustrated in detail in FIG. 15(4), the closed end 141B formed at the vehicle body front side end of the slit 14 has a specified width and it is cut up to by about a substantial half of the outer diameter of the outer column 1. The closed end 142D at the vehicle rear side is formed into a semi-arcuate shape and its diameter size is formed to be the same as a width of the parallel part 143. In addition, an axial length L3 of the slit 14 is formed to be longer than an axial length L4 of each of the clamp members 8A, 8B, and arcuate inner circumferential surfaces 82A, 82B of the clamp members 8A, 8B hold the outer column 1 within a range of the axial length L3 of the slit 14 to reduce efficiently the diameter of the outer column 1.

As described above, since both ends of the slit 14 are closed, a variation in operating force of the operating lever is low. In addition, since the closed end 141B at the vehicle body front side is cut by a substantial half of the outer diameter of the outer column 1, a force requisite for resiliently deforming the outer column 1 is low and a force requisite for operating the operating lever can be restricted low. In addition, since both ends of the slit 14 are closed, deformation of the outer column 1 under the state of component element of the outer column 1 becomes low and a disturbance of size of inner diameter of the outer column 1 generated by this deformation is also reduced.

In FIGS. 15(1) to (3) are shown some modifications of the closed ends formed at both ends of the slit 14. In FIG. 15(1), the closed end 141A formed at the vehicle body front side end of the slit 14 is inclined and cut in such a way that its width at the slit 14 is wide and its width becomes narrow as it is moved away from the slit 14. In addition, the closed end 142A formed at the vehicle body rear side of the slit 14 also has a wider width at the slit 14 and its width becomes narrow as it is moved away from the slit 14.

The closed end 141A at the vehicle body front side is cut by a substantial half of an outer diameter of the outer column 1, and the closed end 142A at the vehicle body rear side is cut shallower than the closed end 141A at the vehicle body front side. It is preferable that the cutting at the closed end 142A of the vehicle body rear side is shallow for assuring a bending strength of the outer column 1 or rigidity against vibration.

In FIG. 15(2), the closed end 141B formed at the vehicle body front side end of the slit 14 and the closed end 142B formed at the vehicle body rear side of the slit 14 are cut in parallel to each other under a specified width. The closed end 141B at the vehicle body front side is cut by about a half of the outer diameter of the outer column 1 and the closed end 142B at the vehicle body rear side is cut shallower than the closed end 141B at the vehicle body front side.

In FIG. 15(3), the closed end 141B formed at the vehicle body front side end of the slit 14 is cut in parallel at a specified width and further up to about substantial half of an outer diameter of the outer column 1. The closed end 142C at the vehicle body rear side is formed in a semi-arcuate shape and has no slit. A diameter D1 of the semi-arcuate closed end 142C is formed to be larger than a width W of the parallel part 143 of the slit 14. Increasing a width of the closed end 142C where a stress is mostly concentrated reduces a concentration of stress to the closed end 142C. It is preferable that no slit is found at the closed end 142C of the vehicle body rear side for assuring either a bending strength of the outer column 1 or rigidity against vibration.

Although the outer column 1 is arranged at the upper side and the inner column 2 is arranged at the lower side in the aforesaid preferred embodiment, it may also be applicable that the outer column 1 is arranged at the lower side and the inner column 2 is arranged at the upper side. In addition, as the slit 14 formed at the outer column 1 and the slit 24 formed at the bushing 22, one having axial one end released and the other one having both axial ends closed may be applied.

In addition, although the engagement protrusions 83A, 83B are formed on a horizontal line passing through a central axis of the outer column 1 in the aforesaid preferred embodiment, it is possible that the engagement protrusions can be formed at optional phase positions. Further, although each of the engagement protrusions 83A, 83B is formed one by one at each of the clamp members 8A, 8B, a plurality of engagement protrusions may be formed. Further, although the engagement protrusions 83A, 83B are of an axial elongated rectangular shape, it is possible to form them into optional shapes such as an axial short column-like protrusion, a long protrusion in a vertical line direction or the like.

Further, although the engagement protrusions 83A, 83B are formed at the clamp members 8A, 8B and the engagement cavities 12A, 12B are formed at the outer column 1 in the aforesaid preferred embodiment, it may also be applicable that the engagement protrusions 83A, 83B are formed at the outer column 1 and the engagement cavities 12A, 12B are formed at the clamp members 8A, 8B.

Further, although the aforesaid preferred embodiments have disclosed the preferred embodiments applied to the steering column device for adjusting a telescopic position of the steering wheel through an axial sliding operation of the outer column in respect to the inner column, they may be applied to a steering column device for absorbing a shock load while the steering wheel is collapsed and moved at the time of secondary collision through an axial relative sliding between the outer column and the inner column.

What is claimed is:

1. A steering column device comprising:
 an inner column;
 a hollow outer column outwardly fitted to said inner column in an axial relative slidable manner and having a slit formed axially over a predetermined length;
 a vehicle body fixing bracket that can be fixed to a vehicle body;
 a clamp member having a hole elongated in an axial direction of the steering column device for allowing telescopic adjustment thereof, arranged inside said bracket, removably interlocked with said outer column and holding an outer circumference of said outer column, said clamp member partially encircling the outer circumference of said outer column; and
 a clamp device having a fastening rod inserted into said hole, for fastening said bracket, reducing a diameter of said outer column through said clamp member and for clamping said inner column against said outer column in such a way that they may not be axially moved relative to each other.

2. The steering column device according to claim 1, wherein said slit is closed at both ends.

3. The steering column device according to claim 2, wherein at least one end of said slit has a pair of branches perpendicularly extending therefrom.

4. The steering column device according to claim 2, wherein both ends of said slit respectively have a pair of branches perpendicularly extending therefrom.

5. A steering column device comprising:
 an inner column;
 a hollow outer column adapted to be outwardly fitted to said inner column in an axial relative slidable manner including:
  a slit formed axially over a predetermined length, and
  an engagement cavity;
 a vehicle body fixing bracket;
 a clamp member adapted to be arranged inside said vehicle body fixing bracket including:
  a hole elongated in an axial direction of said steering column device for allowing telescopic adjustment thereof, and
  an engagement protrusion adapted to be fitted into said engagement cavity to prevent said outer column from rotating relative to said clamp member; and
 a clamp device having a fastening rod inserted into said hole, for fastening said bracket, reducing a diameter of said outer column through said clamp member and for clamping said inner column against said outer column in such a way that they may not be axially moved relative to each other.

6. The steering column device according to claim 5, wherein said slit is closed at both ends.

7. The steering column device according to claim 6, wherein at least one end of said slit has a pair of branches perpendicularly extending therefrom.

8. The steering column device according to claim 6, wherein both ends of said slit respectively have a pair of branches perpendicularly extending therefrom.

9. The steering column device according to claim 5, wherein an inner circumference of said clamp member substantially surrounds an outer circumference of said outer column.

10. A steering column device comprising:
an inner column;
a hollow outer column outwardly fitted to said inner column in an axial relative slidable manner and having a slit formed axially over a predetermined length;
a vehicle body fixing bracket that can be fixed to a vehicle body;
a clamp member having a hole elongated in an axial direction of the steering column device for allowing telescopic adjustment thereof, arranged inside said bracket, removably interlocked with said outer column and holding an outer circumference of said outer column, an inner circumference of said clamp member substantially surrounding the outer circumference of said outer column; and
a clamp device having a fastening rod inserted into said hole, for fastening said bracket, reducing a diameter of said outer column through said clamp member and for clamping said inner column against said outer column in such a way that they may not be axially moved relative to each other.

11. A steering column device comprising:
an inner column;
a hollow outer column outwardly fitted to said inner column in an axial relative slidable manner and having a slit formed axially over a predetermined length and an engagement cavity;
a vehicle body fixing bracket that can be fixed to a vehicle body;
a clamp member having a hole elongated in an axial direction of the steering column device for allowing telescopic adjustment thereof, arranged inside said bracket, removably interlocked with said outer column and holding an outer circumference of said outer column, said clamp member including an engagement protrusion formed in a radial direction towards a center of said outer column, said engagement protrusion adapted to be fitted into said engagement cavity and to prevent said outer column from rotating relative to said clamp member, and
a clamp device having a fastening rod inserted into said hole, for fastening said bracket, reducing a diameter of said outer column through said clamp member and for clamping said inner column against said outer column in such a way that they may not be axially moved relative to each other.

* * * * *